United States Patent
Cremer et al.

(10) Patent No.: US 11,256,055 B2
(45) Date of Patent: Feb. 22, 2022

(54) PRE-MOLD ASSEMBLY FOR BRANCHED OPTICAL CABLE AND RELATED METHOD

(71) Applicant: CORNING RESEARCH & DEVELOPMENT CORPORATION, Corning, NY (US)

(72) Inventors: Dan Allan Cremer, Horseheads, NY (US); Christopher R. Hughes, Scottsdale, AZ (US); Mehrdad Mahmoudi, Phoenix, AZ (US); Jorge Guillermo Zapata Cobos, Reynosa (MX)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/025,190

(22) Filed: Sep. 18, 2020

(65) Prior Publication Data

US 2021/0033813 A1    Feb. 4, 2021

Related U.S. Application Data

(63) Continuation of application No. PCT/US2019/022201, filed on Mar. 14, 2019.

(60) Provisional application No. 62/649,713, filed on Mar. 29, 2018.

(51) Int. Cl.
    *G02B 6/44* (2006.01)
    *G02B 6/38* (2006.01)

(52) U.S. Cl.
    CPC ......... *G02B 6/4475* (2013.01); *G02B 6/3829* (2013.01)

(58) Field of Classification Search
    None
    See application file for complete search history.

(56) References Cited

U.S. PATENT DOCUMENTS

| 4,295,005 A | 10/1981 | Daugherty et al. |
| 4,322,573 A | 3/1982 | Charlebois |
| 4,879,436 A | 11/1989 | Braham |
| 5,313,019 A | 5/1994 | Brusselmans et al. |
| 5,684,274 A | 11/1997 | McLeod |
| 5,844,171 A | 12/1998 | Fitzgerald |

(Continued)

FOREIGN PATENT DOCUMENTS

WO    2017/020076 A1    2/2017

OTHER PUBLICATIONS

International Search Report and Written Opinion of the International Searching Authority; PCT/US2019/022201; dated May 30, 2019; 14 Pages; Commissioner for Patents.

*Primary Examiner* — Jerry Rahll
(74) *Attorney, Agent, or Firm* — William D. Doyle

(57) ABSTRACT

Embodiments of a pre-mold assembly for a distribution cable having one or more tether cables are provided. The assembly includes a first shell having a first inner surface and a first outer surface, a second shell having a second inner surface and a second outer surface, and a clip that couples the first shell to the second shell. The clip has a first leg configured to engage the first outer surface of the first shell and a second leg configured to engage the second outer surface of the second shell. In an assembled state, the inner surfaces of the shells define a first channel configured to hold the distribution cable. Further, the inner surfaces of the shells define a second channel that originates within the shells. The second channel is angled relative to the first channel and is configured to hold the one or more tether cables.

20 Claims, 5 Drawing Sheets

(56) References Cited

U.S. PATENT DOCUMENTS

| | | | |
|---|---|---|---|
| 6,037,544 | A | 3/2000 | Lee et al. |
| 6,466,725 | B2 | 10/2002 | Battey et al. |
| 7,454,106 | B2 | 11/2008 | Cobb et al. |
| 7,945,133 | B2 | 5/2011 | Cody et al. |
| 8,041,178 | B2 | 10/2011 | Lu et al. |
| 8,761,559 | B1 | 6/2014 | Cody et al. |
| 2002/0064364 | A1 | 5/2002 | Battey et al. |
| 2005/0167147 | A1 | 8/2005 | Marsac et al. |
| 2008/0080818 | A1 | 4/2008 | Cobb et al. |
| 2008/0253729 | A1 | 10/2008 | Gronvall et al. |
| 2009/0152746 | A1 | 6/2009 | Wells et al. |
| 2010/0080514 | A1 | 4/2010 | Lu et al. |
| 2013/0113166 | A1 | 5/2013 | Hjerpe |
| 2017/0269319 | A1 | 9/2017 | Miller |

PRE-MOLD ASSEMBLY FOR BRANCHED OPTICAL CABLE AND RELATED METHOD

PRIORITY APPLICATIONS

This application is a continuation of International Application No. PCT/US2019/022201, filed on Mar. 14, 2019, which claims the benefit of priority to U.S. Application No. 62/649,713, filed on Mar. 29, 2018, both applications being incorporated herein by reference.

BACKGROUND

The disclosure relates generally to optical fiber cables and more particularly to optical fiber cables that have tethers branching from a main distribution cable. Optical fiber cables are used to transmit data over distance. Generally, large distribution cables that carry a multitude of optical fibers from a hub are sub-divided at network nodes, which are further sub-divided, e.g., to the premises of individual subscribers. Preferably, these subdivisions are provided for during the manufacturing process of the cable such that higher quality splices are achievable and so that the splice locations can be adequately stabilized and protected.

SUMMARY

In one aspect, embodiments of the invention relate to a pre-mold assembly for a distribution cable having one or more tether cables that branch from the distribution cable. The pre-mold assembly includes a first shell having a first inner surface and a first outer surface, a second shell having a second inner surface and a second outer surface, and a clip that couples the first shell to the second shell. The clip has a first leg configured to engage the first outer surface of the first shell and a second leg configured to engage the second outer surface of the second shell. In an assembled state, the first inner surface of the first shell and the second inner surface of the second shell define a first channel configured to hold the distribution cable. Further, in the assembled state, the first inner surface of the first shell and the second inner surface of the second shell define a second channel. The second channel originates within the first shell and second shell, and the second channel is angled relative to the first channel and configured to hold the one or more tether cables.

In another aspect, embodiments of a branched optical cable are provided. The branched optical cable includes a distribution cable, at least one tether cable branching from the distribution cable at a branch location, and an assembly comprising a first shell, a second shell, and a clip. The assembly is positioned at the branch location. The first shell and second shell define a first channel having a first port on a first side of the assembly into which the distribution cable enters the assembly. Further, a second port is provided on a second side of the assembly out of which the distribution cable exits the assembly. The first shell and second shell also define a second channel having a third port out of which the at least one tether cable exits the assembly. The third port is arranged on the second side of the assembly.

In still another aspect, embodiments of the invention relate to a method of assembling a assembly at a mid-span access location. In the method, a distribution cable is positioned in a first portion of a first channel defined by a first shell. At least one tether cable is positioned in a first portion of a second channel defined by the first shell. A strength member of each of the at least one tether cable is inserted into a first portion of an aperture defined by the first shell. A second shell is coupled to the first shell such that the distribution cable is also positioned within a second portion of the first channel defined by the second shell, the tether cable is also positioned in a second portion of the second channel defined by the second shell, and the strength member of each of the at least one tether cable is also inserted into a second portion of the aperture defined by the second shell. A clip is then attached to the first and second shell to hold them in an assembled configuration.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a molded assembly for protecting and stabilizing a mid-span access location of one or more cable tether from a distribution cable are provided. The molded assembly is used as a pre-mold before a polyurethane overmold is applied at a branch location of a tether cable. Because the polyurethane overmold is applied at temperatures of approximately 50° C., a pre-mold is used to protect the tether splice region from these elevated temperatures and to prevent stresses developed during the cooling of the polyurethane from transferring to the tether splice region. Advantageously, the presently disclosed molded assembly provides a quicker, cleaner, and less expensive pre-mold for the mid-span access location as compared to conventional pre-molds, such as epoxy molding. In embodiments, the molded assembly includes pieces that snap together around a distribution cable and one or more tether cables at the branch location to stabilize and to insulate the tether cables against stresses and elevated temperatures associated with the application of an overmold around the mid-span access location. Additionally, the molded assembly can be installed without the need for adhesives or fasteners. Various exemplary embodiments of a molded assembly are described herein; however, these exemplary embodiments should be considered illustrative and non-limiting.

Figure 1:
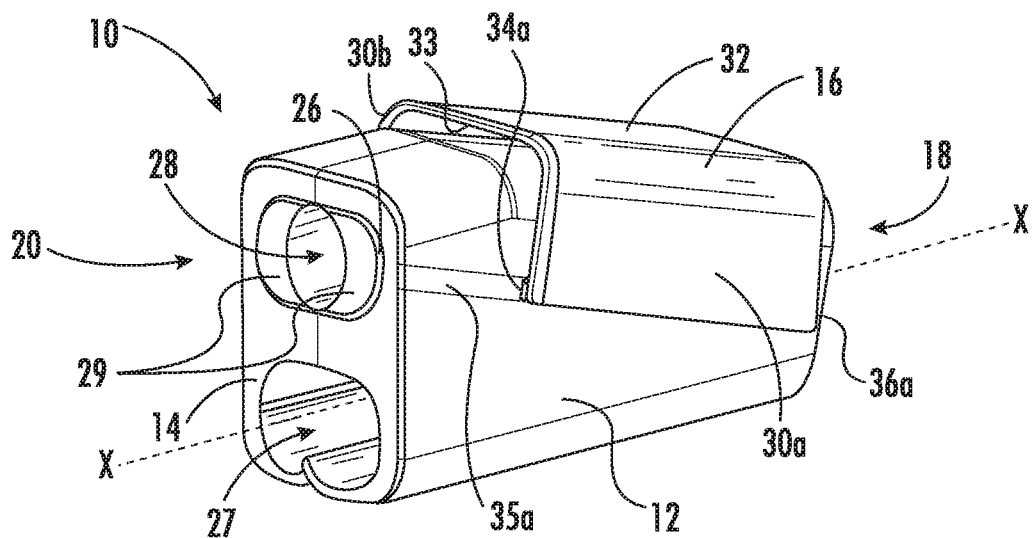
FIG. 1 depicts a molded assembly for stabilizing an optical fiber tether branching from a distribution line, according to an exemplary embodiment.

FIG. 1 provides an assembled view of the molded assembly 10. The assembly 10 is referred to as "molded" because in embodiments the components comprising the assembly 10 are prefabricated via molding, such through injection molding. The assembly 10 may also be referred to as a "pre-mold assembly" or just as an "assembly." In general, the molded assembly 10 includes a first female shell 12, a second male shell 14, and a clip 16. The molded assembly 10 has a first end 18 into which a distribution cable enters and a second end 20 out of which a cable tether and the distribution cable exit. In embodiments, the width of the molded assembly 10 from the first end 18 to the second end 20 is from about 40 mm to about 65 mm, more particularly about 50 mm.

Figure 9:
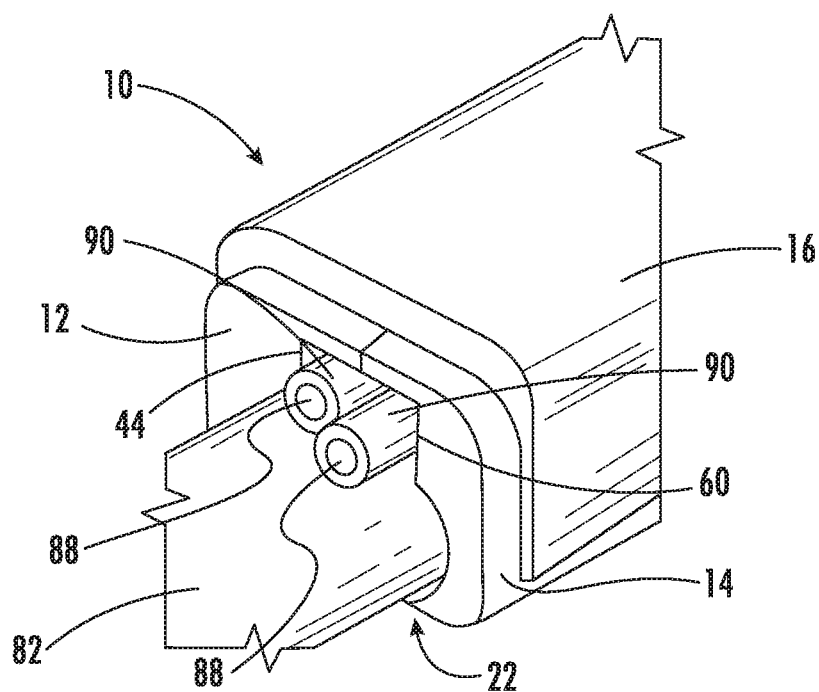
FIG. 9 shows an opposite end of the molded assembly of FIG. 8.

In the assembled state, the female shell 12 and the male shell 14 define a first port 22 (as shown in FIG. 9) at the first end 18 by which the distribution cable enters the molded assembly 10. At the second end 20, the female shell 12 and the male shell 14 define a second port 24 through which the distribution cable exits the molded assembly 10 and a third port 26 through which the tether cable exits the molded assembly 10. In embodiments, the first port 22 and the second port 24 are substantially aligned along axis X and define a first channel 27, and the third port 26 is arranged above the second port 24. The third port 24 is in communication with a second channel 28 that is aligned along an axis B that is angled relative to the axis X. In particular, the axis B is angled such that there is a predefined space between the third port 26 and the second port 24. In embodiments, the predefined space is from 1 mm to 5 mm. In other embodiments, the predefined space is from 3 mm to 4 mm, and in a particular embodiment, the predefined space is 3.5 mm.

As can be seen in FIG. 1, the molded assembly 10 may include one or more plugs 29 to adjust the opening area of the third port 26 so that it is matched to the size and/or number of tether cables exiting the third port 26. As can be seen in FIG. 1, two plugs 29 are provided, which (as will be discussed more fully below) are provided when one cable tether is being divided from the distribution line.

Figure 2:
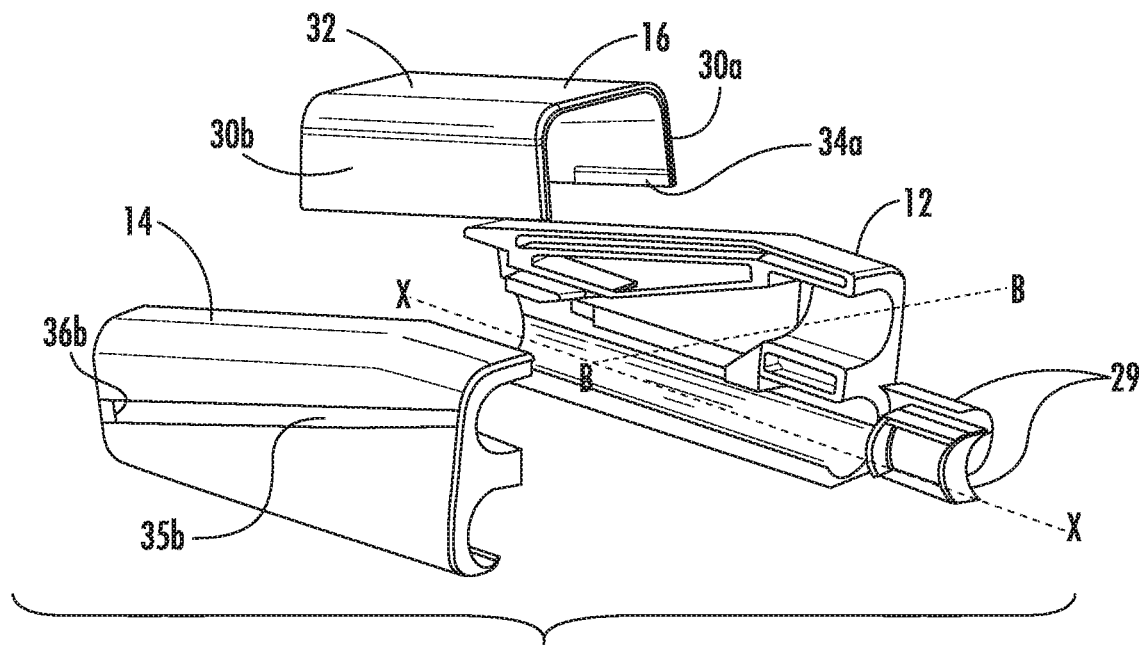
FIG. 2 is an exploded view of the molded assembly of FIG. 1.

The female shell 12 and the male shell 14 are held together with the clip 16. The clip 16 has a generally inverted U-shaped construction defining a first leg 30a and a second leg 30b that are joined by a top wall 32. On an interior surface 33 of the clip 16, at least a first tongue 34a projects inwardly from the first leg 30a, and at least a second tongue 34b projects inwardly from the second leg 30b. The first tongue 34a and the second tongue 34b are adapted to engage a first groove 35a formed into an outer surface of the female shell 12 and a second groove 35b formed into an outer surface of the male shell 14, respectively. In embodiments, the tongues 34a, 34b are configured to slide into the grooves 35a, 35b from the second end 20. In such embodiments, the stops 36a, 36b can be included in the grooves 35a, 35b to limit the movement of the tongues 34a, 34b within the grooves 35a, 35b, e.g., so as to position the clip 16 in a particular relation to the female shell 12 and the male shell 14. As can be seen in FIG. 2, the stops 36a, 36b are positioned toward the first end 18 of the molded assembly 10. In other embodiments, the clip 16 can instead be pushed down from the top of the molded assembly 10 such that the legs 30a, 30b deflect outwardly until the grooves 35a, 35b are reached. At that point, the tongues 34a, 34b will snap back and into the grooves 35a, 35b so as to secure the clip 16 to the female shell 12 and the male shell 14.

FIGS. 3A-3D depict various views of the female shell 12. In the perspective view of FIG. 3A, it can be seen that the female shell 12 has an elongated receiving slot 37 extending along the contour of the upper portion of the female shell 12. The female shell 12 also includes a mortise 38. As will be described more fully below, the receiving slot 37 and the mortise 38 are adapted to engage complementary male portions of the male shell 14 to align and secure the female shell 12 to the male shell 14 in the assembled state.

Figure 3A:
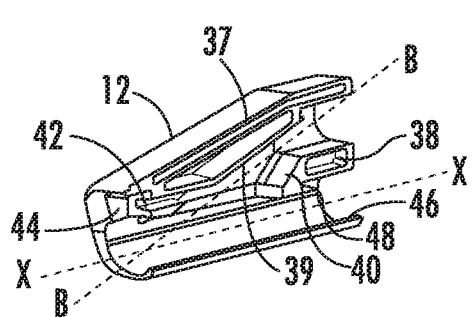
FIGS. 3A-3D depict various views of a female shell of the molded assembly of FIG. 1, according to an exemplary embodiment.
Figure 3B:
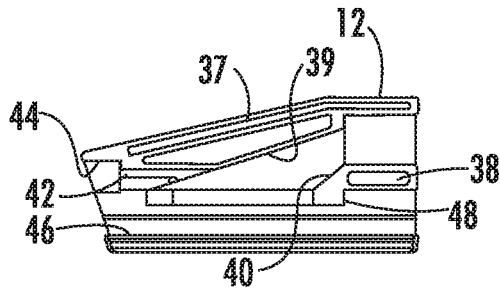

The female shell 12 also includes a first guide surface 39 and a second guide surface 40. These guide surfaces 39, 40 are canted upwardly from axis X and define the channel 28 along axis B. As shown in FIG. 3B, a lower end of the guide surface 39 leads into a first aperture portion 42 through which a strength member of the tether cable is passed. The first aperture portion 42 opens into a first anchoring surface 44. As will be discussed more fully below, a crimp is attached to each strength member and is tensioned, at least in part, against the first anchoring surface 44.

Figures 3C, 3D:
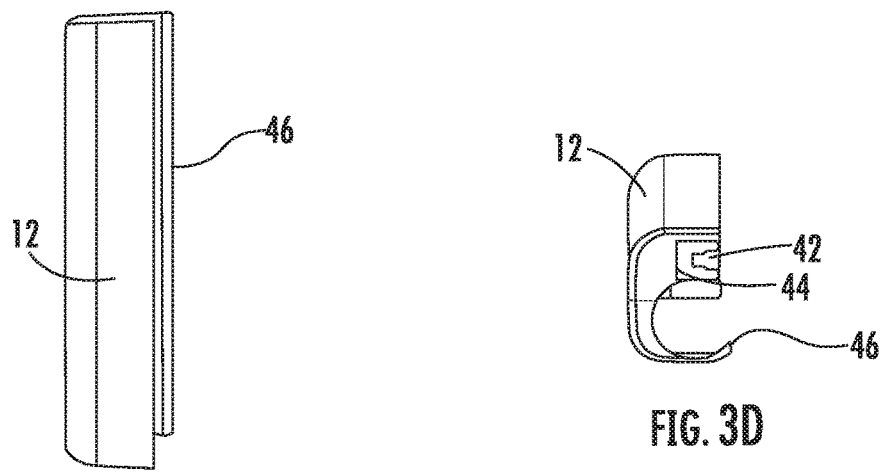

As can be seen in FIG. 3B, the first channel 27 along axis X is defined in part by a lip 46. The lip 46 projects inwardly from an inner surface of the female shell 12 and is configured to flex so as to accommodate distribution cables of different sizes. Further, as can be seen in FIGS. 3C and 3D, the lip 46 defines the largest width of the female shell 12 and extends past a center line of the molded assembly 10. Additionally, the female shell 12 includes a first edge section 48 that engages an access channel in the distribution cable, which is a rectangular cutout of the distribution jacket though which the optical fibers can be accessed. In this way, any tensile forces along the distribution cable are transferred to the molded assembly 10 instead of to the optical fibers and splice.

Figure 4A:
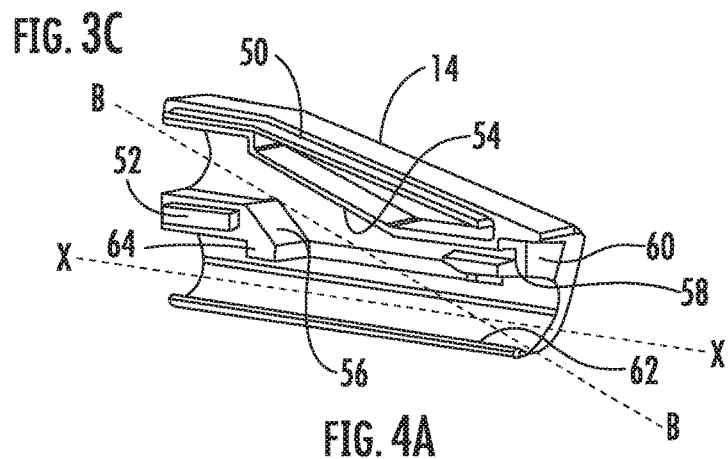
FIGS. 4A-4D depict various views of a male shell of the molded assembly of FIG. 1, according to an exemplary embodiment.
Figures 4B, 4C:
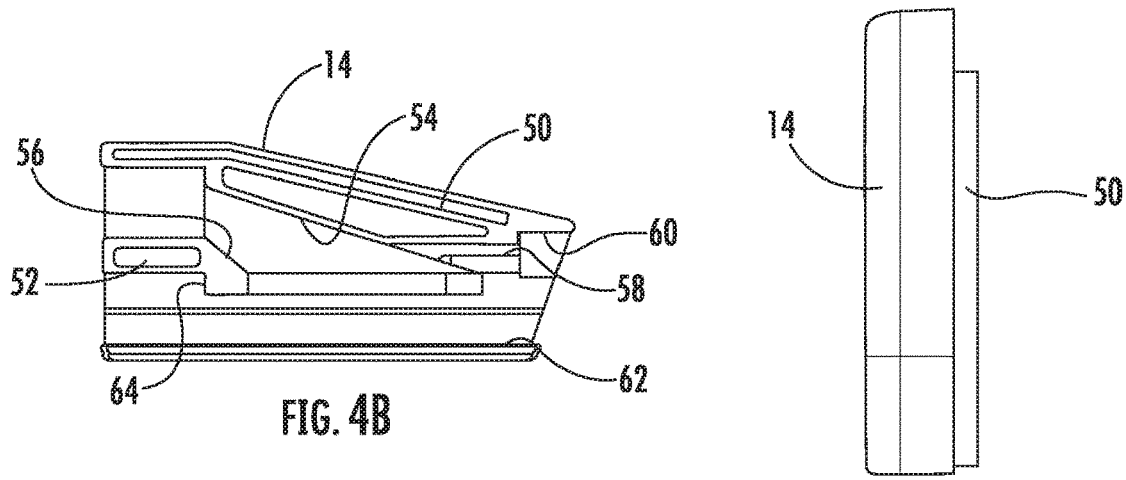
Figure 4D:
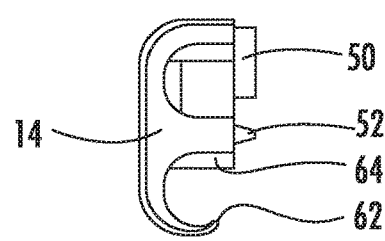

FIGS. 4A-4D depict the male shell 14. As can be seen in FIGS. 4A and 4B, the male shell 14 includes an elongated projecting tab 50 adapted to engage the receiving slot 37 of the female shell 12. Further, the male shell 14 includes a tenon 52 adapted to engage the mortise 38 of the female shell 12. In embodiments, the tenon 52 has a trapezoidal cross-section (e.g., as shown in FIG. 4D) to provide a lead-in profile for mating with the mortise 38 of the female shell 12. In such an embodiment, the mortise 38 may also be a trapezoidal depression to match the contour of the trapezoidal tenon 52. In this way, the receiving slot 37 and the mortise 38 engage the projecting tab 50 and the tenon 52, respectively, to align and secure the male shell 14 to the female shell 12. In embodiments, the receiving slot 37 and the mortise 38 engage the projecting tab 50 and the tenon 52, respectively, via friction fit; although, in other embodiments, a snap-lock engagement could be used, among others. The male shell 14 also includes a first guide surface 54 and a second guide surface 56 that complement the first guide surface 39 and the second guide surface 40 of the female shell 12. In this way, the first guide surfaces 39, 54 together define an upper portion of the second channel 28, and the second guide surfaces 40, 56 together define a lower portion of the second channel 28.

The first guide surface 54 of the male shell 14 leads into a second aperture portion 58. The first aperture portion 42 of the female shell 12 and the second aperture portion 58 together define an aperture through which the strength member of the tether cable extends. Similarly, the second aperture portion 58 opens into a second anchoring surface 60, which together with the first anchoring surface 44 defines a region against which is tensioned a crimp attached to the strength member. Also like the female shell 12, the male shell 14 includes a lip 62 that in part defines the first channel 27 along axis X. In embodiments, contrary to the design of the lip 46 of the female shell 12, though, the lip 62 of the male shell 14 does not project to the same lateral extent. Indeed, as can be seen in FIG. 4C, the projecting tab 50 instead defines the widest width of the male shell 14, and as can be seen in FIG. 4D, the lip 62 stops short of the center line of the molded assembly 10. Further, as shown in FIGS. 4A and 4B, the male shell 14 features a second edge section 64 that complements the first edge section 48 of the female shell 12 to engage the access channel of the distribution cable.

Figure 5A:
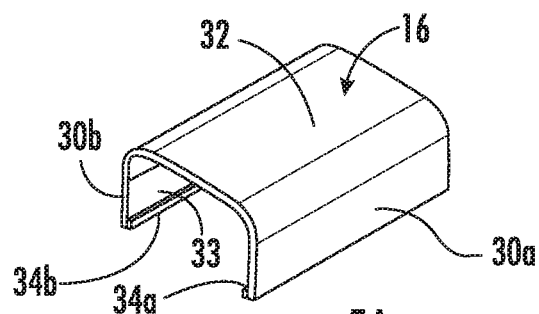
FIGS. 5A-5D depict various views of a clip of the molded assembly of FIG. 1, according to an exemplary embodiment.
Figure 5B:
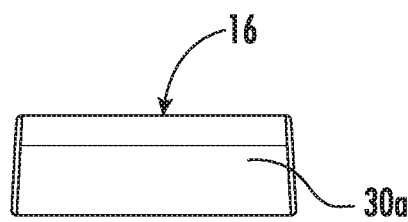
Figure 5C:
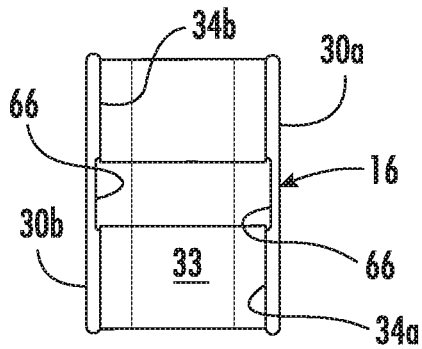
Figure 5D:
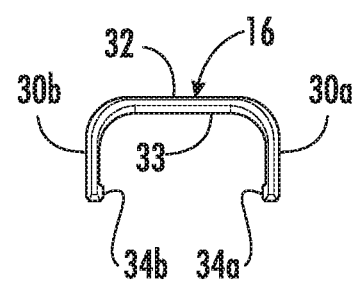
Figure 6A:
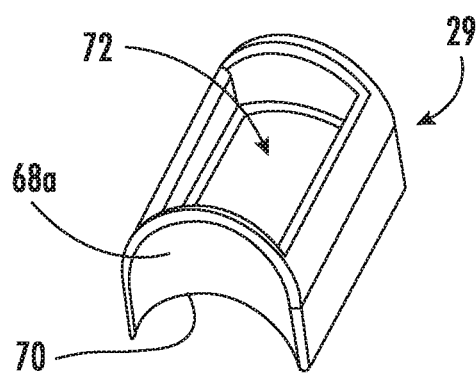
FIGS. 6A-6D depict various views of a plug of the molded assembly of FIG. 1, according to an exemplary embodiment.
Figure 6B:
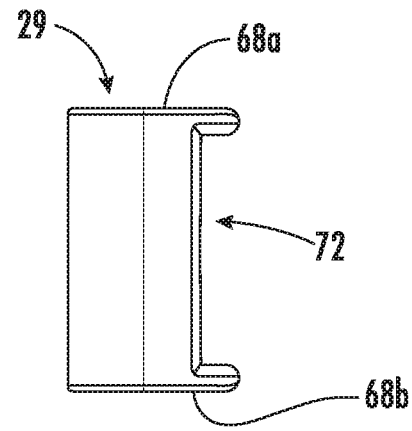
Figure 6C:
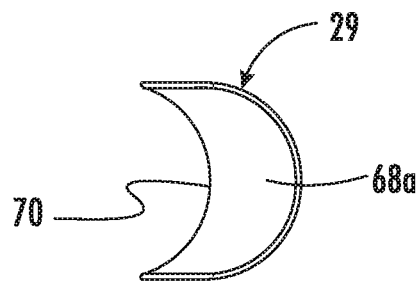
Figure 6D:
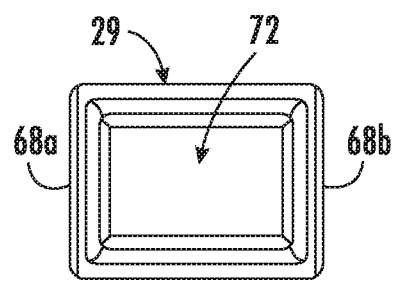

As mentioned above, the first female shell 12 and the second male shell 14 are coupled or mated and then held together by the clip 16. FIGS. 5A-5D depict various views of an embodiment of the clip 16. As discussed briefly above, the first leg 30a, the second leg 30b, and the top wall 32 define the clip 16. As shown in FIG. 5C, the first tongue 34a projects from the interior surface 33 of the first leg 30a, and the second tongue 34b projects from the interior surface 33 of the second leg 30b. The tongues 34a, 34b each include a cleft 66, which is a molding relief introduced through the injection molding process. In embodiments where the clip 16 is not injection molded, the cleft 66 may not be present.

FIGS. 6A-6D depict various views of a plug 29. The plug 29 is provided in the molded assembly 10 to prevent liquid overmold material (e.g., polyurethane) from entering into the interior of the molded assembly 10 during the overmolding process, which will be described more fully below. The plug 29 is defined by a first end face 68a spatially disposed from a second end face 68b. The end faces 68a, 68b are crescent-shaped and define a curved inner surface 70 adapted to engage the tether cable exiting the third port 26 of the molded assembly 10. As can be seen best in FIG. 6A, embodiments of the plug 29 feature a depression 72 that is primarily provided to relieve stress during the injection molding process of forming the plug 29.

Figure 7A:
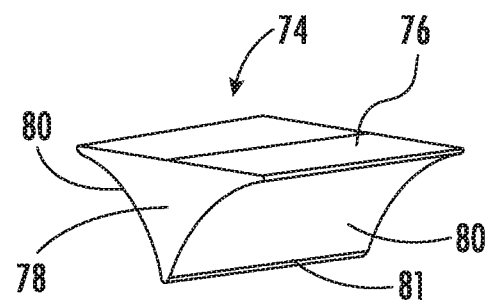
FIGS. 7A-7C depict various views of another plug for a molded assembly, according to an exemplary embodiment.
Figure 7B:
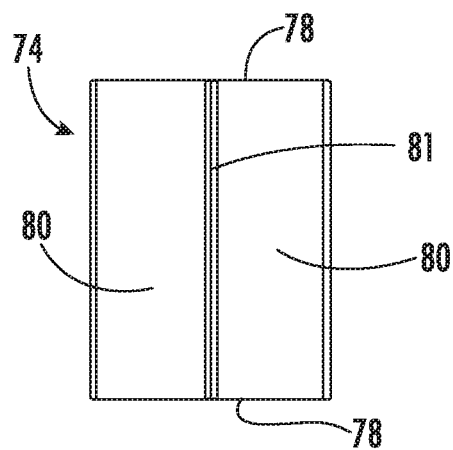
Figure 7C:
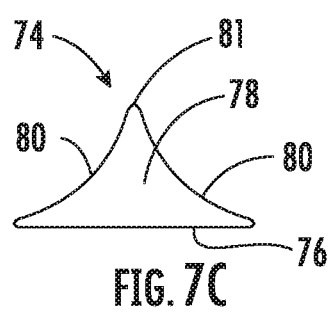

FIGS. 7A-7C depict another embodiment of a plug 74 for embodiments of the molded assembly 10 through which two tether cables exit through the third port 26. Like the plug 29, the plug 74 prevents liquid overmold material (e.g., polyurethane) from entering into the molded assembly during the overmolding process, but a different geometry is provided to account for the two tether cables. In that regard, the plug 74 is defined by a first surface 76 and two end faces 78 perpendicularly disposed from the first surface 76. Disposed between the two end faces 78 are two curved surfaces 80 sharing a common vertex 81 that are configured to engage two cable tethers exiting through the third port 26. As can be seen in the FIG. 7A, the plug 74 is generally in the shape of a triangular prism albeit with two curved surfaces 80.

Figure 8:
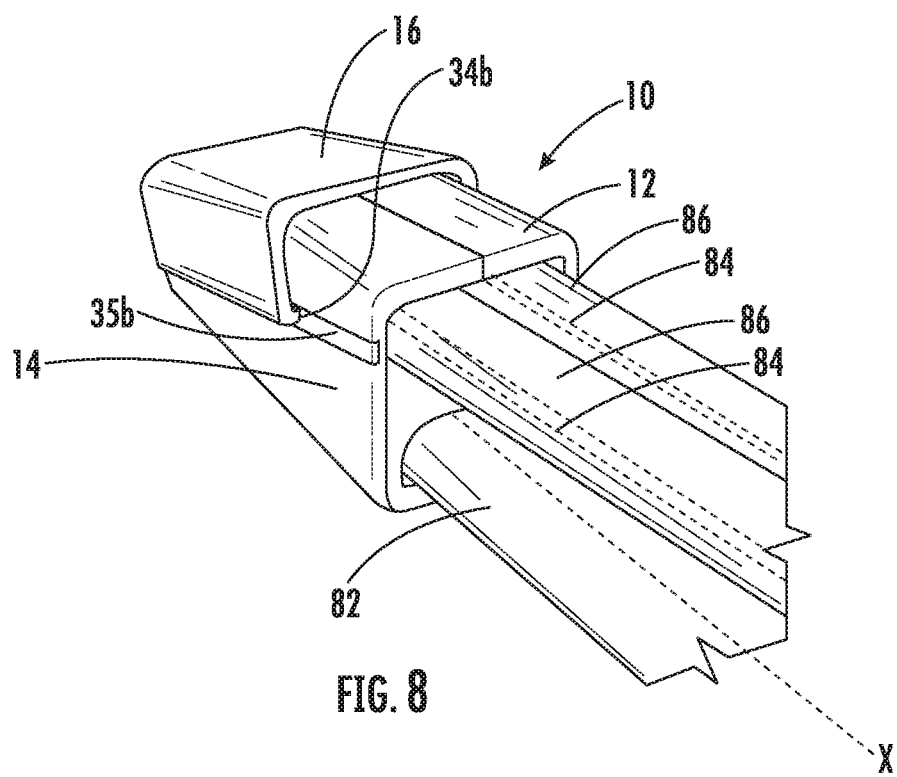
FIG. 8 shows an end of the molded assembly assembled around a distribution cable and two tether cables, according to an exemplary embodiment.

Having described the components of the molded assembly 10, FIGS. 8 and 9 depict the molded assembly 10 installed on a distribution cable 82 from which two tether cables 84 are branched. As can be seen in FIG. 9, the distribution cable 82 enters through the first port 22, and as shown in FIG. 8, the distribution cable 82 exits the molded assembly 10 through the second port 24.

In order to attach a tether cable 84 to the distribution cable 82, a mid-span access location is opened in the distribution cable 82, and a buffer tube contained within the distribution cable 82 is selected for splicing to the tether cable 84. The distribution cable 82 may be manufactured to provide for splicing of tether cables 84 at various predetermined locations along its length. In such instances, the buffer tube can be manufactured for splicing at such predetermined locations. The buffer tube around the optical fibers is removed so that an optical fiber or optical fibers of the tether cable 84 can be spliced to one or more of the optical fibers of the buffer tube. In a buffer tube having a plurality of optical fibers, some or all of the optical fibers may be spliced to a fiber of the tether cable 84, while the remaining optical fibers disposed within the buffer tube remain intact and continue through the distribution cable 82. The optical fibers in the buffer tube are then spliced to the optical fibers in the tether cable 84, and the splice joint can be protected with one or more splice protectors. Tubing 86 that is flexible and crush-resistant is placed around the tether cables 84 to protect the tether cables 84 in the region of the splice.

Upon attaching the tether cables 84 to the distribution cable 82, the molded assembly 10 is assembled around the tether cables 84 and the distribution cable 82. For the purpose of illustration, reference will be made to installation of the female shell 12 first followed by the male shell 14; however, in other embodiments, the order can be reversed. During assembly, the female shell 12 is attached to the distribution cable 82 such that the distribution cable 82 resides in the portion of the channel 27 defined by the female shell 12. In particular, the distribution cable 82 is positioned such that a region of the mid-span access location abuts the first edge section 48. The tubing 86 is then positioned into the portion of the channel 28 defined by the first guide surface 39 and the second guide surface 40 of the female shell 12. If a single tether cable 82 is provided, then a plug 29 is inserted into the portion of the third port 26 defined by the female shell 12. Further, strength members 88, which may be glass reinforced plastic rods, are inserted the first aperture portion 42 of the female shell 12. After positioning the components within the female shell 12, the male shell 14 is mated with the female shell 12 to encase the distribution cable 82 and tether cable(s) 84. If only a single tether cable 84 is provided, then another plug 29 is positioned in the portion of the third port defined by the male shell 14; otherwise, only a single, triangular plug 74 is utilized between the two tether cables 84. Thereafter, the clip 16 is installed on the mated female shell 12 and male shell 14. A crimp 90, such as a copper rope stop crimp, is attached to each strength member 88 of its respective tether cable 84. Each strength member 88 is then tensioned so that each crimp 90 abuts against the first and second anchoring surfaces 44, 60.

After installing the molded assembly 10 on the distribution cable 82 and tether cables 84, an overmold is applied. For example, the overmold may be a polyurethane jacket that is pumped into a mold in which the molded assembly 10, distribution cable 82, and tether cables 84 reside. As mentioned above, the polyurethane is typically at elevated temperatures (e.g., about 50° C.), and the molded assembly 10 substantially prevents the hot liquid overmold material from reaching the mid-span access location and exposed optical fibers. Additionally, the molded assembly 10 insulates the mid-span access location against thermal and mechanical stresses, especially from cooling polyurethane, which produces thermal strain as a result of changes in density during cooling. In embodiments, the overmold is applied around the molded assembly 10 and at least a portion of the distribution cable 82 and the tether cables 84. For example, the overmold may extend several inches, e.g., up to five inches, up to seven inches, or up to ten inches, in both directions from the location of the mid-span access location.

The embodiments of the molded assembly 10 provided herein are an advancement over the prior method of enclosing the mid-span access location in a two-part epoxy formulation. In particular, the epoxy required long curing times, which increased processing and cycle times. Indeed, the epoxy enclosure required about thirteen to fifteen minutes to produce of which seven to nine minutes were dedicated to allowing the epoxy to cure. By using prefabricated molded parts that fit together, the cure time can be completely eliminated, and the time to assemble the components is on the order of two to three minutes. Further, the parts of the molded assembly are much less expensive to produce and stock than the epoxy resin, which not only has a higher material cost (e.g., about $5 per epoxy pre-mold as compared to $0.20-$0.30 per pre-mold for the molded assembly 10) but which also has higher cleanup costs associated with it. In embodiments, the parts of the molded assembly are manufactured from relatively inexpensive high density polyethylene (HDPE) through an injection molding process, although other polymers and manufacturing processes can be used in different embodiments. Another advantage of the molded assembly 10 over the epoxy resin is that the molded assembly increases the pull strength of the tethers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A pre-mold assembly for a distribution cable having one or more tether cables that branch from the distribution cable, the pre-mold assembly comprising:
   a first shell having a first inner surface and a first outer surface;
   a second shell having a second inner surface and a second outer surface; and
   a clip that couples the first shell to the second shell in an assembled state, the clip having a first leg configured to engage the first outer surface of the first shell and a second leg configured to engage the second outer surface of the second shell;
   wherein, in the assembled state, the first inner surface of the first shell and the second inner surface of the second shell define a first channel configured to hold the distribution cable; and
   wherein, in the assembled state, the first inner surface of the first shell and the second inner surface of the second shell define a second channel, the second channel originating within the first shell and second shell and the second channel being angled relative to the first channel, and wherein the second channel is configured to hold the one or more tether cables.

2. The pre-mold assembly of claim 1, wherein the first inner surface of the first shell further defines an elongated slot and a mortise, wherein the second inner surface of the second shell further defines an elongated tab and a tenon, and wherein the elongated slot is configured to receive the elongated tab and the mortise is configured to receive the tenon when the first shell and the second shell are in the assembled state.

3. The pre-mold assembly of claim 1, wherein the first shell comprises a first groove formed into the first outer surface, wherein the second shell comprises a second groove formed into the second outer surface, wherein the first leg of the clip further comprises a first tongue adapted to be received in the first groove, and wherein the second leg of the clip further comprises a second tongue adapted to be received into the second groove.

4. The pre-mold assembly of claim 3, wherein the first groove has a first opening at a first end of the first shell and the second groove has a second opening at the first end of the second shell, and wherein the first groove has a first stop located towards a second end of the first shell and the second groove has a second stop located towards the second end of the first shell, and wherein the first tongue and second tongue of the clip are configured to slide through the first opening and the second opening, respectively and abut the first stop and second stop, respectively, when the first shell and the second shell are in the assembled state.

5. The pre-mold assembly of claim 1, wherein the first shell further comprises a lip configured to flex to accommodate distribution cables of different sizes.

6. The pre-mold assembly of claim 1, wherein the first shell and the second shell together define an aperture through which a strength member of each of the one or more tether cables can be inserted.

7. The pre-mold assembly of claim 1, further comprising at least one plug configured to be inserted into the second channel so as to position the one or more tether cables within the second channel.

8. The pre-mold assembly of claim 7, wherein each of the at least one plug comprises two end faces, the end faces being spatially-disposed and having a crescent shape, and a curved inner surface disposed between the two end faces.

9. The pre-mold assembly of claim 7, wherein the at least one plug comprises two end faces that are spatially disposed from each other and arranged perpendicular to a planar surface and wherein two curved surfaces having a common vertex span between the two end faces.

10. The pre-mold assembly of claim 1, wherein the first inner surface of the first shell defines a first edge section and the second inner surface of the second shell defines a second edge section and wherein the first edge section and the second edge section are configured to engage a mid-span access location of the distribution cable.

11. A branched optical cable, comprising:
    a distribution cable;

at least one tether cable branching from the distribution cable at a branch location;

an assembly comprising a first shell, a second shell, and a clip, the assembly positioned at the branch location, the clip coupling the first shell to the second shell and the clip having a first leg engaging a first outer surface of the first shell and a second leg engaging a second outer surface of the second shell;

wherein the first shell and second shell define a first channel having a first port on a first side of the assembly into which the distribution cable enters the assembly and a second port on a second side of the assembly out of which the distribution cable exits the assembly; and wherein the first shell and second shell define a second channel having a third port out of which the at least one tether cable exits the assembly, the third port being arranged on the second side of the assembly.

12. The branched optical cable of claim 11, wherein the first shell and the second shell further define an aperture on the first side of the assembly, wherein a strength member of each of the at least one tether cable extends through the aperture, and wherein at least one crimp prevents each strength member from being pulled through the aperture.

13. The branched optical cable of claim 11, wherein the first shell comprises an elongated slot and a mortise, wherein the second shell comprises an elongated tab and a tenon, and wherein the elongated slot is configured to receive the elongated tab and the mortise is configured to receive the tenon.

14. The branched optical cable of claim 11, comprising two tether cables and further comprising a plug, the plug comprising two end faces that are spatially disposed from each other and arranged perpendicular to a planar surface and wherein two curved surfaces having a common vertex span between the two end faces, each curved surface configured to engage one of the two tether cables.

15. A branched optical cable, comprising:
a distribution cable;
at least one tether cable branching from the distribution cable at a branch location;
an assembly comprising a first shell, a second shell, and a clip, the assembly positioned at the branch location;
wherein the first shell and second shell define a first channel having a first port on a first side of the assembly into which the distribution cable enters the assembly and a second port on a second side of the assembly out of which the distribution cable exits the assembly;

wherein the first shell and second shell define a second channel having a third port out of which the at least one tether cable exits the assembly, the third port being arranged on the second side of the assembly; and wherein the branched optical cable comprises only one tether cable and further comprises two plugs, each plug having two end faces, the two end faces being spatially-disposed and having a crescent shape, and also having a curved surface disposed between the two end faces and configured to centrally position the tether cable within the third port.

16. A method of assembling an assembly at a mid-span access location, the method comprising the steps of:
positioning a distribution cable in a first portion of a first channel defined by a first shell;
positioning at least one tether cable in a first portion of a second channel defined by the first shell;
inserting a strength member of each of the at least one tether cable into an a first portion of an aperture defined by the first shell;
coupling a second shell to the first shell such that the distribution cable is also positioned within a second portion of the first channel defined by the second shell, the tether cable is also positioned in a second portion of the second channel defined by the second shell, and the strength member of each of the at least one tether cable is also inserted into a second portion of the aperture defined by the second shell;
attaching a first leg of a clip to a first outer surface of the first shell and a second leg of the clip to a second outer surface of the second shell to hold the first shell and the second shell in an assembled configuration.

17. The method of claim 16, wherein coupling the second shell to the first shell further comprises inserting an elongated tab from the second shell into a receiving slot of the first shell.

18. The method of claim 17, wherein coupling the second shell to the first shell further comprises inserting a tenon of the second shell into a mortise of the first shell.

19. The method of claim 16, further comprising the step of attaching a crimp to the strength member of each of the at least one tether cable such that the strength member cannot pass back through the aperture.

20. The method of claim 16, further comprising the step of inserting at least one plug into the second channel.

* * * * *

UNITED STATES PATENT AND TRADEMARK OFFICE
CERTIFICATE OF CORRECTION

| | | |
|---|---|---|
| PATENT NO. | : 11,256,055 B2 | Page 1 of 1 |
| APPLICATION NO. | : 17/025190 | |
| DATED | : February 22, 2022 | |
| INVENTOR(S) | : Dan Allan Cremer et al. | |

It is certified that error appears in the above-identified patent and that said Letters Patent is hereby corrected as shown below:

In the Claims

In Column 10, Line 20, in Claim 16, delete "an a" and insert -- a --.

Signed and Sealed this
Thirty-first Day of May, 2022

Katherine Kelly Vidal
*Director of the United States Patent and Trademark Office*